July 21, 1959  
C. D. WILSON  
2,895,491  
INLET VALVE SUPPORTING AND ACTUATING MECHANISM  
FOR ELASTIC FLUID TURBINES  
Filed March 17, 1958  
2 Sheets-Sheet 1

Inventor  
Charles D. Wilson  
By Arthur M. Streich  
Attorney

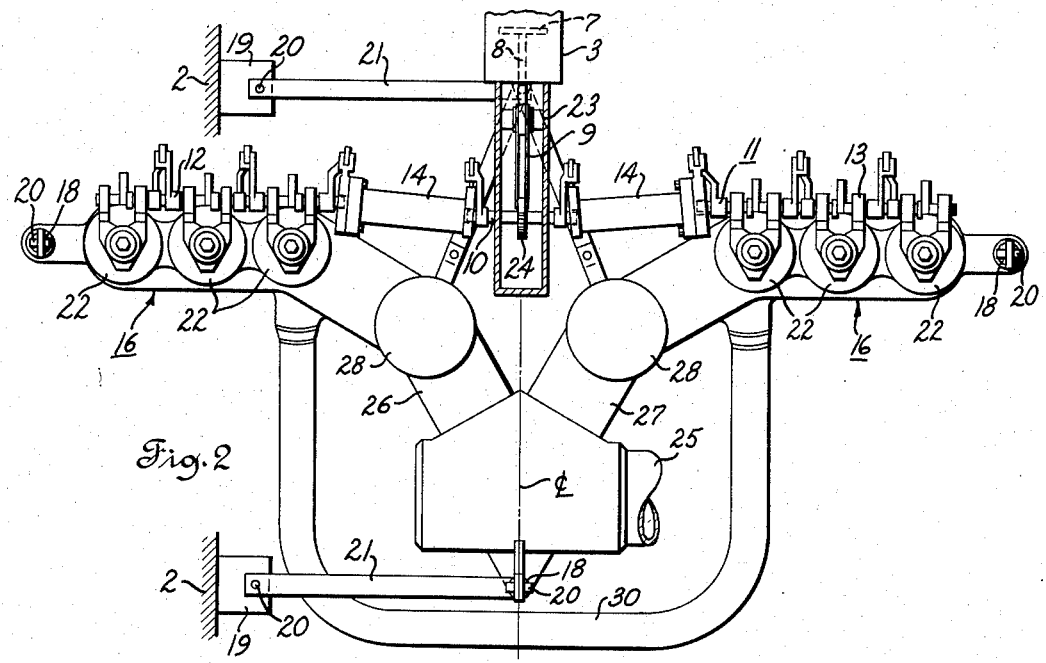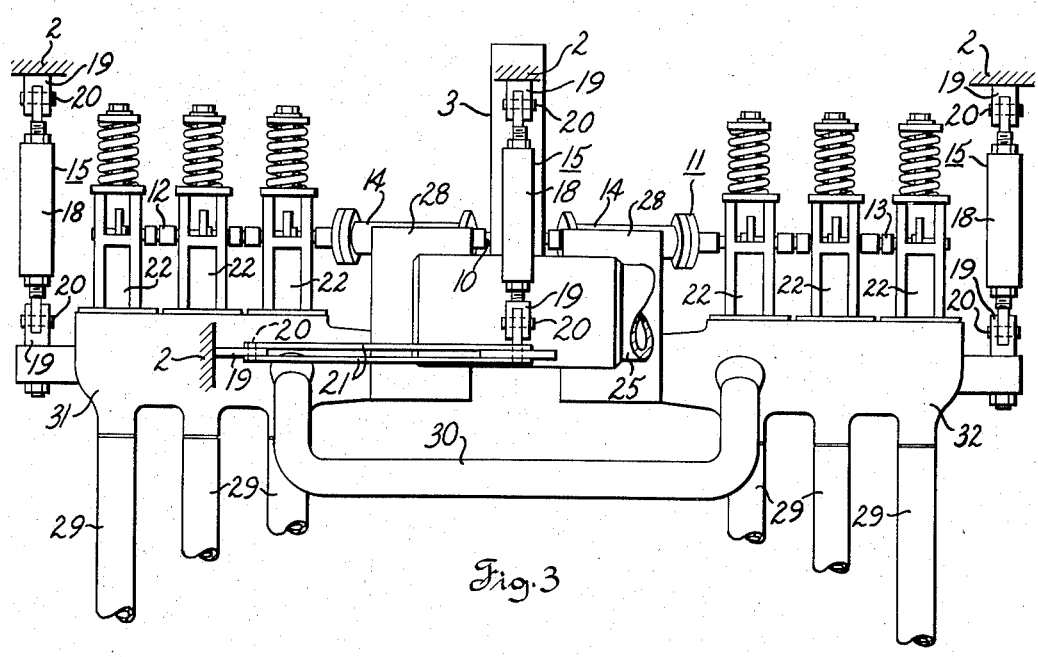

United States Patent Office 2,895,491
Patented July 21, 1959

2,895,491

INLET VALVE SUPPORTING AND ACTUATING MECHANISM FOR ELASTIC FLUID TURBINES

Charles D. Wilson, West Allis, Wis., assignor to Allis-Chalmers Manufacturing Company, Milwaukee, Wis.

Application March 17, 1958, Serial No. 721,899

10 Claims. (Cl. 137—35)

The present invention relates generally to improvements in elastic fluid turbines and specifically to a turbine having improved means for supporting and actuating inlet valves that control the flow of motive fluid to the turbine.

Heretofore in inlet valve supporting and actuating mechanisms such as are described in my previous United States Patent 2,745,422, turbine designers have separated the inlet valve and steam chest assembly from the turbine proper and joined the two by means of fluid conduits to avoid the harmful stresses being induced in the valve chest and turbine casings by the high temperatures and pressures of the modern steam turbine. The valve chests in such an arrangement are supported by a yoke of a pantograph assembly. This allows the valve chest to move to compensate the stresses due to expansion and contraction of the conduits connecting the valve chest to the turbine. Expansion and contraction is a result of the high temperatures and changes in temperature during starting, stopping and changes in load upon the turbine. In such an arrangement a fluid pressure operated servomotor, used to produce the necessary force to open and close the inlet valves, was located in the pedestal of the turbine and the force generated was transmitted from the servomotor to an inlet valve operating mechanism through links to a gear segment journaled in the movable yoke. The gear segment applied the generated force to a spur gear on a cam shaft to position the inlet valves. The transmission of these forces through the linkage to the gear segment, which was supported by the movable yoke of the pantograph arrangement, applied the force to the yoke of the pantograph of the valve chest supporting structure. Therefore, heavy links connecting the yoke to the foundation were necessary to prevent the entire assembly from swinging every time the force was applied to change the opening of valves. If the entire assembly were permitted to swing as a result of operating the valves, the amount of adjustment of the valves would no longer be proportional to the amount the linkage was moved and an error would result in the adjustment of the valves.

The present invention proposes to provide a simplified support and actuating mechanism for the valve chests that provides for motion due to thermal expansion and contraction but eliminates the need for the heavy links to prevent the valve chest assembly from swinging as the valve operating force is applied. This is accomplished by eliminating any effect of this force on the valve chest supporting assembly. In the present invention a valve actuating servomotor is mounted, as before, in the turbine pedestal and supported by the turbine foundation. However, according to the present invention, a section of a valve operating cam shaft and gearing connecting the servomotor to this portion of the cam shaft are also mounted on the pedestal of turbine foundation. The section of the cam shaft mounted on the pedestal is connected by flexible couplings to other sections of the cam shaft supported by the valve chest. The force generating servomotor, the gearing comprising a spur gear mounted on the pedestal supported section of the cam shaft and a gear segment connecting the servomotor to the spur gear, are all supported by the pedestal and the force generated to operate the valves is applied directly to the cam shaft and no portion of this force is transmitted to the valve chest supporting assembly, to cause it to move or swing. The supporting assembly therefore need only provide for movement of the valve chest resulting from thermal expansion and contraction and this is taken care of according to this invention by a simplified arrangement of supporting arms and guide bars.

It is therefore an object of the invention to provide in an elastic fluid turbine an improved inlet valve supporting structure and actuating means in which the various parts are constructed and arranged in a manner which permits the valve chest to move freely with thermal expansion and contraction but which permits the force generated to actuate the inlet valves to be applied directly to the cam shaft without reacting on he valve chest supporting structure.

Another object of this invention is to provide in an elastic fluid turbine installation an inlet valve structure and operating mechanism supported by new and improved supporting structure.

It is another object of this invention to provide an elastic fluid turbine, an inlet valve structure and actuating gear in which all the forces generated by the valve actuating means are contained within the pedestal and pedestal supported structure.

Another object of this invention is to provide in an elastic fluid turbine an arrangement of actuating means for the inlet valves in which the principal parts are located in an enclosed space in turbine pedestal structure.

Other objects will appear hereinafter as a description of the invention proceeds. The novel features of the invention and how the objects are attained will appear more fully from this specification and the accompanying drawings showing an embodiment of the invention and forming a part of this application and all of these novel features are intended to be pointed out in the appended claims.

In the drawings:

Fig. 2 is a plane view of the turbine inlet valves and the supporting and actuating structure therefor; and Fig. 3 is a front elevation view of the inlet valve supporting and actuating structure.

Figure 1:
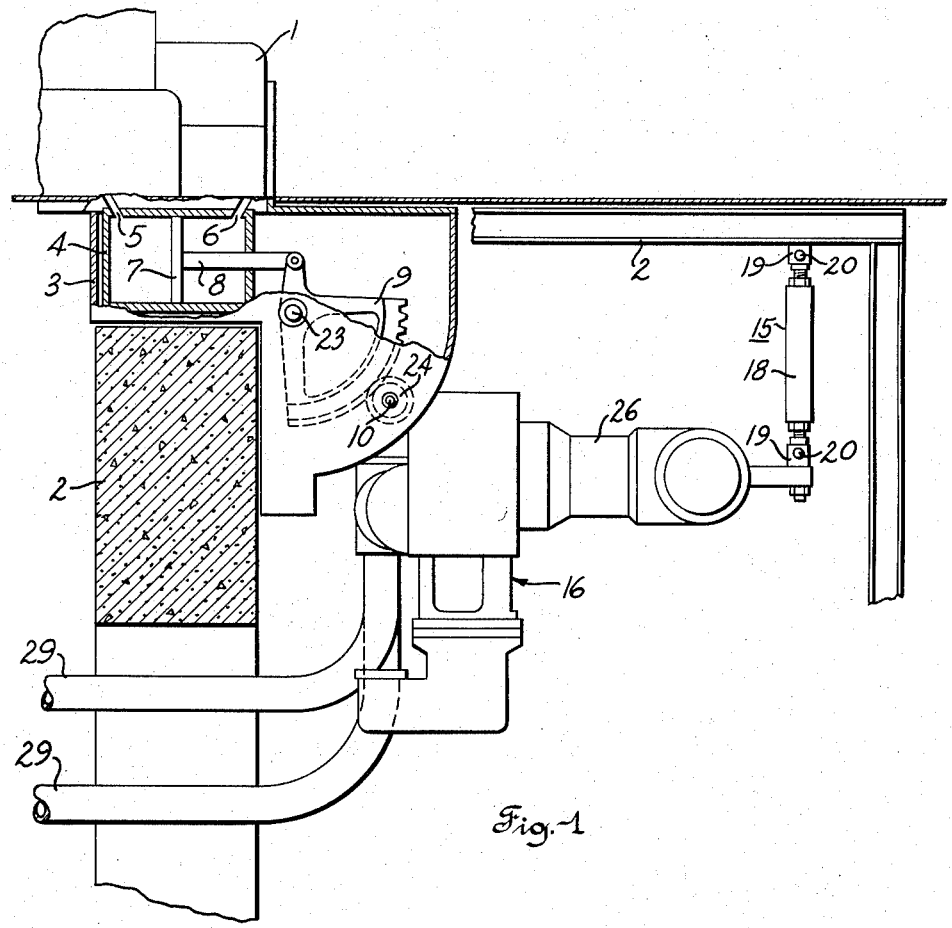
Fig. 1 is a side elevation of the inlet valve assembly and the supporting and actuating structure therefor.

As shown in the drawings and in Fig. 1 in particular, a turbine 1 is supported by foundation structure 2. The term foundation structure is defined as a permanent rigid structure, and is meant to include the pedestal assembly 3 to which the turbine and certain of the turbine components are secured. The pedestal 3 includes force generating means shown as a fluid pressure operated servomotor 4 located in and supported by the pedestal 3. The fluid pressure operated servomotor is speed responsive to a turbine governor, not shown. The servomotor consists of ports 5 and 6 connected to a source of fluid, not shown. A piston 7 and a piston rod 8 are shown as being a part of fluid pressure operated servomotor 4. An end of the piston rod 8 remote from piston 7 is connected to gear segment 9 also shown as being located within and supported by the pedestal structure 3. The fluid pressure servomotor 4 is arranged in a horizontal plane and approximately symmetrical with respect to a vertical plane passing through the longitudinal axis ₵ of the turbine as can be seen in Fig. 2. The servomotor 4 thus directs a force along an axis coincident with rod 8 in a vertical plane passing through the longitudinal axis of the turbine. As shown in Fig. 1, the gear segment 9 engages a spur gear 24 on a shaft 10 to connect the fluid pressure operated servomotor 4 to the shaft 10 which is a first portion of a valve shaft assembly 11, shown in Fig. 2. The first portion 10 of shaft assembly 11 is journaled within and supported by the pedestal structure 3.

In Figs. 1 and 3 support means 15 support a valve assembly 16 in a horizontal plane approximately symmetrical with respect to a vertical plane passing through the longitudinal axis of the turbine indicated as the line ₡ in Fig. 2. The support means 15, shown in Fig. 3, support the valve assembly 16 for movement relative to the turbine 1 and foundation structure 2. The support structure comprises a plurality of parallel and generally vertical support arms 18 pivotally connecting horizontally spaced points on the valve assembly 16 to foundation structure 2 vertically spaced from the valve assembly 16. The support arms 18 are connected to the valve assembly 16 and foundation 2 by brackets 19 and pins 20. The support arms 18 define planes transverse to the longitudinal axis of the turbine.

In Fig. 2, a set of parallel and generally horizontal guide bars 21 connect, by brackets 19 and pins 20, points horizontally spaced apart in the longitudinal axial direction on a valve assembly 16 to points horizontally spaced apart in the longitudinal axial direction on the foundation structure 2 horizontally spaced from the valve assembly to guide movement of the valve assembly and limit its movement to translatory movement. Motive fluid supply means, as shown in Fig. 2, comprise motive fluid supply conduit 25, supported by vertical support 18 indicated in Fig. 3 as being connected by brackets 19 and pins 20 to conduit 25 and to foundation 2 to support conduit 25 in a horizontal plane approximately symmetrical with respect to a vertical plane passing through the longitudinal axis, indicated as the line ₡. Horizontal guide bar 21 is connected to conduit 25 and at the end remote from conduit 25 is connected by bracket 19 and pin 20 to foundation 2, and guides the movement of inlet conduit 25 and limits its movement to translatory movement. Conduits 26 and 27 carry motive fluid to the inlet valves 22. A pair of quick closing emergency stop valves 28 may be included in conduits 26 and 27. The construction and operation of the pair of stop valves 28 form no part of the present invention but are merely indicated to show that these valves may be included in an assembly with the turbine inlet valves. Inlet valves 22 regulate the flow of motive fluid to the turbine carried by motive fluid inlet conduits 29, shown in Figs. 3 and 1. Conduit 30 maintains balanced pressure between valve group 31 and valve group 32 of valve assembly 16. In the event that one of the pair of emergency stop valves 28 shuts off the flow of motive fluid to the inlet valves, conduit 30 will supply steam to the valve group shut off by the stop valve.

The first portion 10 of the valve shaft assembly 11 is connected by flexible torque transmitting means 14 to a second portion 12 and a third portion 13 of the valve shaft assembly 11 journaled within and supported by valve assembly 16. Portions 12 and 13 of the valve shaft assembly engage inlet valves 22 of the assembly 16. The construction of the inlet valves 22 and their operation is the same as that described in my previous United States Patent 2,745,422, issued May 15, 1956.

In operation when the governor, not shown, calls for a change in the setting of the inlet valves 22, fluid is admitted through one of the pair of ports 5 or 6 and drained through the other. The piston 7 and piston rod 8 are biased in the direction desired.

When the piston 7 and piston rod 8 change position, the gear segment 9 attached to the piston rod 8 rotates about pivot 23. The gear segment 9 rotating about its pivot 23 and meshed with spur gear 24 on the first portion 10 of the valve shaft assembly 11 causes the first portion 10 of the valve shaft assembly 11 to rotate in a direction opposite to the direction in which the gear segment 9 is rotating and the flexible torque transmitting means 14 carry the movement from the first portion 10 to the second and third portions 12 and 13 of the valve shaft assembly 11 causing the valves 22 to change to the setting called for by the speed governor, not shown.

The support structure 15 and the guide bars 21 allow the valve assembly 16 movement due to thermal expansion and contraction, but limit the movement to translatory movement. First portion 10 of valve shaft assembly 11, gear segment 9 which engages spur gears 24 of first portion 10 of valve shaft assembly 11 and piston 7 and piston rod 8 of servomotor 4 are located within and supported by pedestal 3 of foundation structure 2 so that the force generated by servomotor 4 is contained within pedestal 3 and foundation 2 and does not cause valve assembly 16 to swing or move.

These and other features and advantages will be obvious to those skilled in this art. It will also be obvious to those skilled in this art that the illustrated embodiment of the invention provides a new and improved valve supporting and actuating structure for an elastic fluid turbine and accordingly accomplishes the objects of the invention. On the other hand it will also be obvious to those skilled in the art that the illustrated embodiment of the invention may be variously changed and modified or features thereof singly or collectively embodied in other arrangements than that illustrated, without departing from the spirit of the invention or sacrificing all of the advantages thereof, and that accordingly the disclosure herein is illustrative only and the invention is not limited thereto.

What is claimed is:

1. In an elastic fluid turbine apparatus having a turbine and foundation structure supporting said turbine; motive fluid supply means connected to said turbine; valve means in said motive supply means; support structure supporting said valve means for movement limited to translatory movement relative to said turbine and said foundation structure, said support structure comprising a set of support arms pivotally connecting horizontally spaced points on said valve means to foundation structure vertically spaced from said valve means, and a set of guide bars connecting horizontally spaced points on said valve means to foundation structure horizontally spaced from said valve means; a shaft assembly for operating said valve means, a first portion of said shaft assembly rotatably supported by said foundation structure, a second portion of said shaft assembly rotatably supported by and engaging said valve means, flexible torque transmitting means connecting said first portion to said second portion of said shaft, and force generating means supported by said foundation and connected to said first portion of said shaft assembly for rotating said shaft assembly to operate said valve means.

2. In an elastic fluid turbine apparatus having a turbine and foundation structure supporting said turbine; motive fluid supply means connected to said turbine; a valve chest in said motive supply means and including fluid flow control means; support structure supporting said valve chest for movement limited to translatory movement relative to said turbine and said foundation structure, said support structure comprising a set of support arms pivotally connecting horizontally spaced points on said valve chest to foundation structure vertically spaced from said valve chest, and a set of guide bars connecting horizontally spaced points on said valve chest to foundation structure horizontally spaced from said valve chest; a shaft assembly for operating said fluid flow control means, a first portion of said shaft assembly rotatably supported by said foundation structure, second and third portions of said shaft assembly rotatably supported by said valve chest and engaging said fluid flow control means, flexible torque transmitting means connecting said first portion to said second and third portions of said shaft, and force generating means supported by said foundation and connected to said first portion of said shaft assembly for rotating said shaft assembly to operate said fluid flow control means.

3. In an elastic fluid turbine apparatus having a turbine and foundation structure supporting said turbine; motive fluid supply means connected to said turbine; a valve chest in said motive supply means and including fluid flow control means; support structure supporting said valve chest for movement limited to translatory movement relative to said turbine and said foundation structure, said support structure comprising a set of generally vertical support arms pivotally connecting horizontally spaced points on said valve chest to foundation structure, and a set of generally horizontal guide bars connecting horizontally spaced points on said valve chest to foundation structure; a shaft assembly for operating said fluid flow control means, a first portion of said shaft assembly rotatably supported by said foundation structure, second and third portions of said shaft assembly rotatably supported by said valve chest and engaging said fluid flow control means, flexible torque transmitting means connecting said first portion to said second and third portions of said shaft, and force generating means supported by said foundation and connected to said first portion of said shaft assembly for rotating said shaft assembly to operate said fluid flow control means.

4. In an elastic fluid turbine apparatus having a turbine and foundation structure supporting said turbine; motive fluid supply means connected to said turbine; a valve chest in said motive supply means and including fluid flow control means; support structure supporting said valve chest for movement limited to translatory movement relative to said turbine and said foundation structure, said support structure comprising a set of parallel and generally vertical support arms pivotally connecting horizontally spaced points on said valve chest to foundation structure, and a set of parallel and generally horizontal guide bars connecting horizontally spaced points on said valve chest to foundation structure; a shaft assembly for operating said fluid flow control means, a first portion of said shaft assembly rotatably supported by said foundation structure, second and third portions of said shaft assembly rotatably supported by said valve chest and engaging said fluid flow control means, flexible torque transmitting means connecting said first portion to said second and third portions of said shaft, and force generating means supported by said foundation and connected to said first portion of said shaft assembly for rotating said shaft assembly to operate said fluid flow control means.

5. In an elastic fluid turbine apparatus having a turbine and foundation structure supporting said turbine; motive fluid supply means connected to said turbine; a valve chest in said motive supply means and including fluid flow control means; support structure supporting said valve chest for movement limited to translatory movement relative to said turbine and said foundation structure, said support structure comprising a plurality of support arms pivotally connecting horizontally spaced points on said valve means to foundation structure vertically spaced from said valve chest, at least two of said support arms defining a plane transverse to the longitudinal axis of said turbine, and a set of guide bars connecting points horizontally spaced apart in the longitudinal axial direction on said valve chest to foundation structure horizontally spaced from said valve chest; a shaft assembly for operating said fluid flow control means, a first portion of said shaft assembly rotatably supported by said foundation structure, second and third portions of said shaft assembly rotatably supported by said valve chest and engaging said fluid flow control means, flexible torque transmitting means connecting said first portion to said second and third portions of said shaft, and force generating means supported by said foundation and connected to said first portion of said shaft assembly for rotating said shaft assembly to operate said fluid flow control means.

6. In an elastic fluid turbine apparatus having a turbine and foundation structure supporting said turbine; motive fluid supply means connected to one end of said turbine; a valve chest in said motive supply means and including fluid flow control means, said valve chest being spaced away from the motive fluid inlet end of said turbine and arranged in a horizontal plane to be approximately symmetrical with respect to a vertical plane passing through the horizontal axis of said turbine; support structure supporting said valve chest for movement limited to translatory movement relative to said turbine and said foundation structure, said support structure comprising a set of support arms pivotally connecting horizontally spaced points on said valve chest to foundation structure vertically spaced from said valve chest, and a set of guide bars connecting horizontally spaced points on said valve chest to foundation structure horizontally spaced from said valve chest; a shaft assembly for operating said fluid flow control means, a first portion of said shaft assembly rotatably supported by said foundation structure in a horizontal plane and arranged to be approximately symmetrical with respect to said vertical plane through the longitudinal axis of said turbine, second and third portions of said shaft assembly rotatably supported by said valve chest and engaging said fluid flow control means, flexible torque transmitting means connecting said first portion to said second and third portions of said shaft, and force generating means supported by said foundation and arranged to direct a force in said vertical plane passing through the longitudinal axis of said turbine, said force generating means connected to said first portion of said shaft assembly for rotating said shaft assembly to operate said fluid flow control means.

7. In an elastic fluid turbine apparatus having a turbine and foundation structure supporting said turbine; motive fluid supply means connected to one end of said turbine, said foundation structure including a pedestal structure connected to the motive fluid inlet end of said turbine; a valve chest in said motive supply means and including fluid flow control means, said valve chest being spaced away from said inlet end of said turbine and arranged in a horizontal plane to be approximately symmetrical with respect to a vertical plane passing through the longitudinal axis of said turbine; support structure supporting said valve chest for movement limited to translatory movement relative to said turbine and said foundation structure, said support structure comprising a set of support arms pivotally connecting horizontally spaced points on said valve chest to foundation structure vertically spaced from said valve chest, and a set of guide bars connecting horizontally spaced points on said valve chest to foundation structure horizontally spaced from said valve chest; a shaft assembly for operating said fluid flow control means, a first portion of said shaft assembly rotatably supported by said pedestal structure in a horizontal plane and arranged to be approximately symmetrical with respect to said vertical plane through the longitudinal axis of said turbine, second and third portions of said shaft assembly rotatably supported by said valve chest and engaging said fluid flow control means, flexible torque transmitting means connecting said first portion to said second and third portions of said shaft, and force generating means supported by said pedestal structure and arranged to direct a force in said vertical plane passing through the longitudinal axis of said turbine, said force generating means connected to said first portion of said shaft assembly for rotating said shaft assembly to operate said fluid flow control means.

8. In an elastic fluid turbine apparatus having a turbine and foundation structure supporting said turbine; motive fluid supply means connected to one end of said turbine, said foundation structure including a pedestal structure connected to the motive fluid inlet end of said turbine;

a valve chest in said motive supply means and including fluid flow control means, said valve chest being spaced away from said inlet end of said turbine; support structure supporting said valve chest for movement limited to translatory movement relative to said turbine and said foundation structure, said support structure comprising a set of support arms pivotally connecting horizontally spaced points on said valve chest to foundation structure vertically spaced from said valve chest, and a set of guide bars connecting horizontally spaced points on said valve chest to foundation structure horizontally spaced from said valve chest; a shaft assembly for operating said fluid flow control means, a first portion of said shaft assembly rotatably supported by and partially enclosed within said pedestal structure, second and third portions of said shaft assembly rotatably supported by said valve chest and engaging said fluid flow control means, flexible torque transmitting means connecting said first portion to said second and third portions of said shaft, and force generating means totally enclosed within and supported by said pedestal structure, said force generating means connected to said first portion of said shaft assembly for rotating said shaft assembly to operate said fluid flow control means.

9. In an elastic fluid turbine apparatus having a turbine and foundation structure supporting said turbine; motive fluid supply means connected to one end of said turbine, said foundation structure including a pedestal structure connected to the motive fluid inlet end of said turbine; a valve chest in said motive supply means and including fluid flow control means, said valve chest being spaced away from said inlet end of said turbine and arranged in a horizontal plane to be approximately symmetrical with respect to a vertical plane passing through the longitudinal axis of said turbine; support structure supporting said valve chest for movement limited to translatory movement relative to said turbine and said foundation structure, said support structure comprising a set of support arms pivotally connecting horizontally spaced points on said valve chest to foundation structure vertically spaced from said valve chest, and a set of guide bars connecting horizontally spaced points on said valve chest to foundation structure horizontally spaced from said valve chest; a shaft assembly for operating said fluid flow control means, a first portion of said shaft assembly rotatably supported by and partially enclosed within said pedestal structure in a horizontal plane and arranged to be approximately symmetrical with respect to said vertical plane through the longitudinal axis of said turbine, second and third portions of said shaft assembly rotatably supported by said valve chest and engaging said fluid flow control means, flexible torque transmitting means connecting said first portion to said second and third portions of said shaft, and a fluid pressure operated servomotor supported by and enclosed within said pedestal structure and arranged in a horizontal plane to be approximately symmetrical with respect to a vertical plane passing through the longitudinal axis of said turbine to direct a force in said vertical plane passing through the longitudinal axis of said turbine, said fluid pressure operated servomotor connected by a gear segment connected to said servomotor and supported by said pedestal structure to a spur gear on said first portion of said shaft assembly for rotating said shaft assembly to operate said inlet valves.

10. In an elastic fluid turbine apparatus having a turbine and foundation structure supporting said turbine; motive fluid supply means connected to one end of said turbine, said foundation structure including a pedestal structure connected to the motive fluid inlet end of said turbine; a valve chest in said motive supply means and including inlet valves, said valve chest being spaced away from said inlet end of said turbine and arranged in a horizontal plane to be approximately symmetrical with respect to a vertical plane passing through the longitudinal axis of said turbine; support structure supporting said valve chest for movement limited to translatory movement relative to said turbine and said foundation structure, said support structure comprising a plurality of parallel and generally vertical support arms pivotally connecting horizontally spaced points on said valve chest to foundation structure vertically spaced from said valve chest, at least two of said support arms defining a plane transverse to the longitudinal axis of said turbine, and a set of parallel and generally horizontal guide bars connecting points horizontally spaced apart in the longitudinal axial direction on said valve chest to foundation structure horizontally spaced from said valve chest; a shaft assembly for operating said inlet valves, a first portion of said shaft assembly rotatably supported by and partially enclosed within said pedestal structure in a horizontal plane and arranged to be approximately symmetrical with respect to said vertical plane through the longitudinal axis of said turbine, second and third portions of said shaft assembly rotatably supported by said valve chest and engaging said inlet valves, flexible torque transmitting means connecting said first portion to said second and third portions of said shaft, and a fluid pressure operated servomotor enclosed within and supported by said pedestal structure and arranged in a horizontal plane to be approximately symmetrical with respect to a vertical plane passing through the longitudinal axis of said turbine to direct a force in said vertical plane passing through the longitudinal axis of said turbine, said fluid pressure operated servomotor connected to said first portion of said shaft assembly for rotating said shaft assembly to operate said fluid flow control means.

No references cited.